Oct. 31, 1944.  E. B. MILLER  2,361,863
LIQUID DISPENSING APPARATUS
Filed July 12, 1938   5 Sheets-Sheet 2
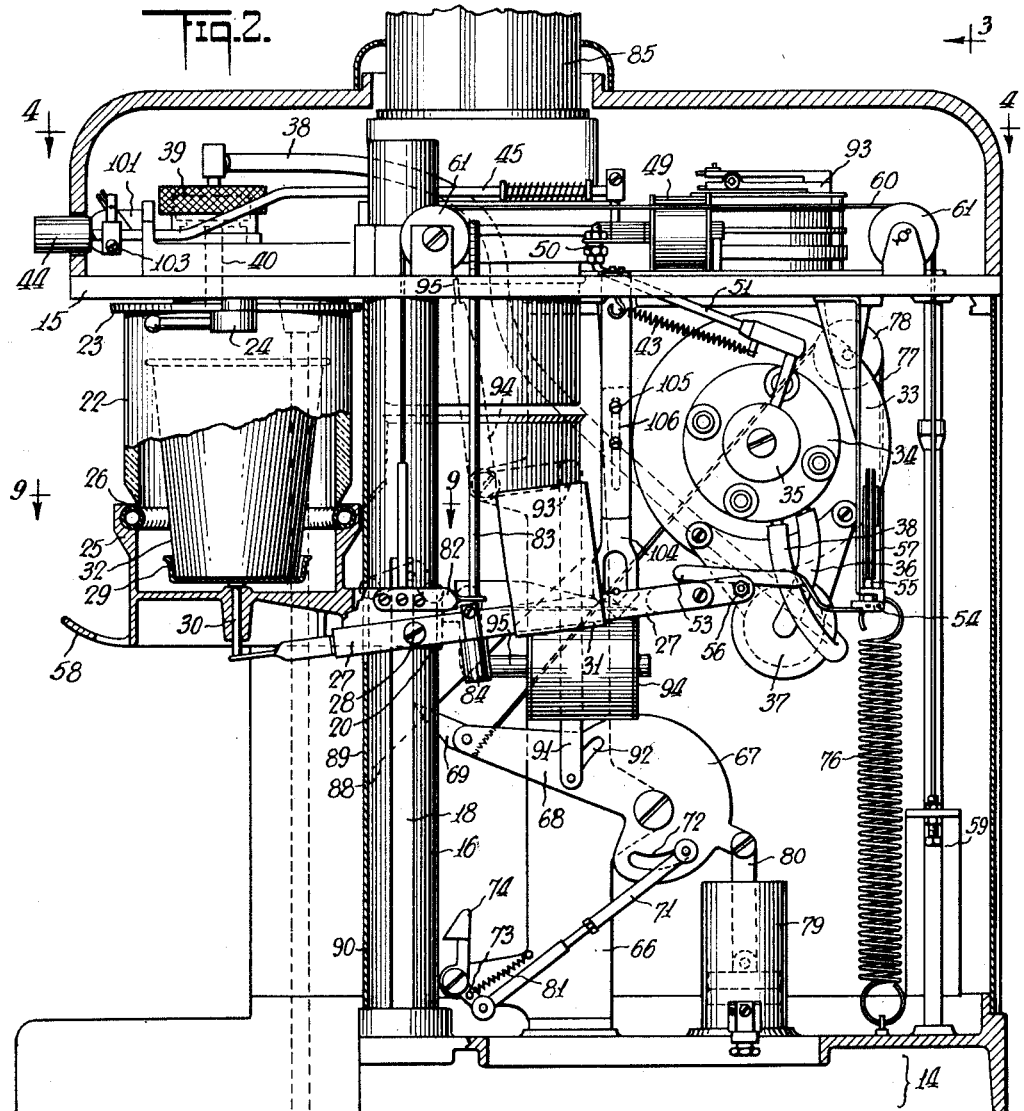
INVENTOR
Ernest B. Miller
BY Herman Seid
ATTORNEY Oct. 31, 1944.  E. B. MILLER  2,361,863
LIQUID DISPENSING APPARATUS
Filed July 12, 1938  5 Sheets-Sheet 3
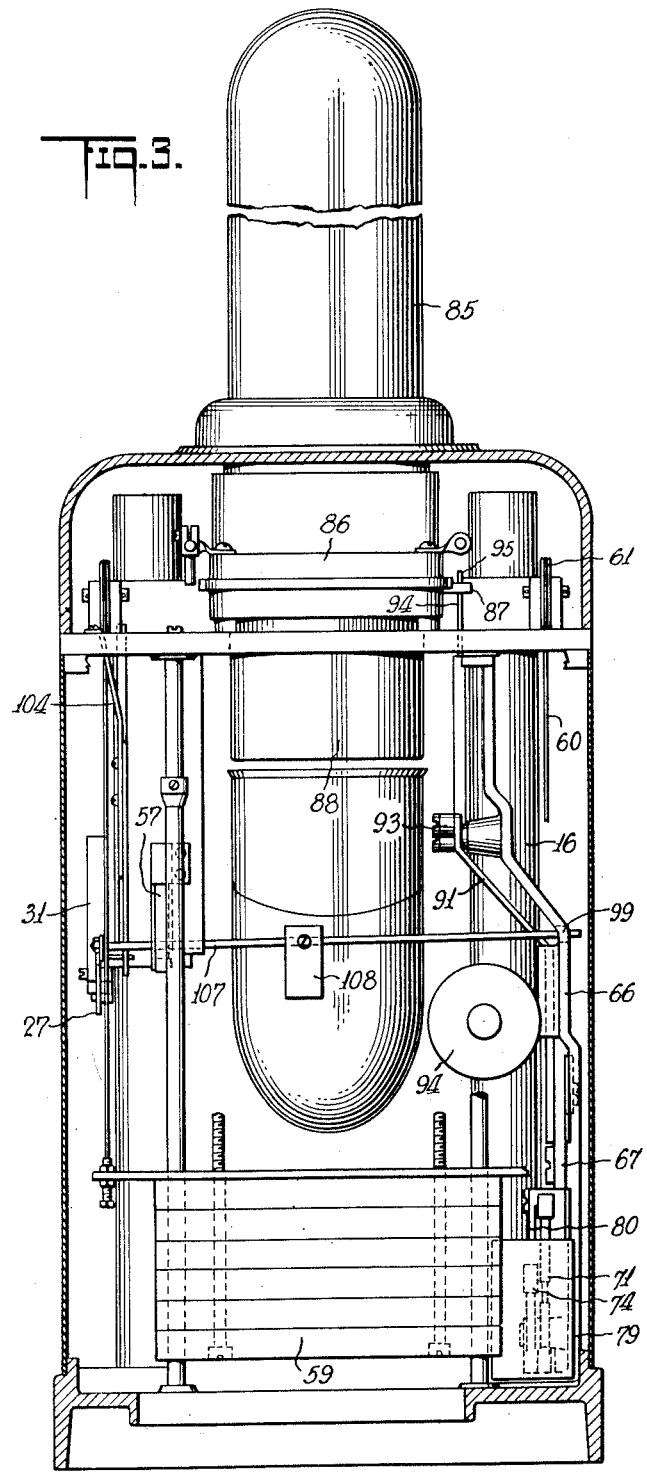
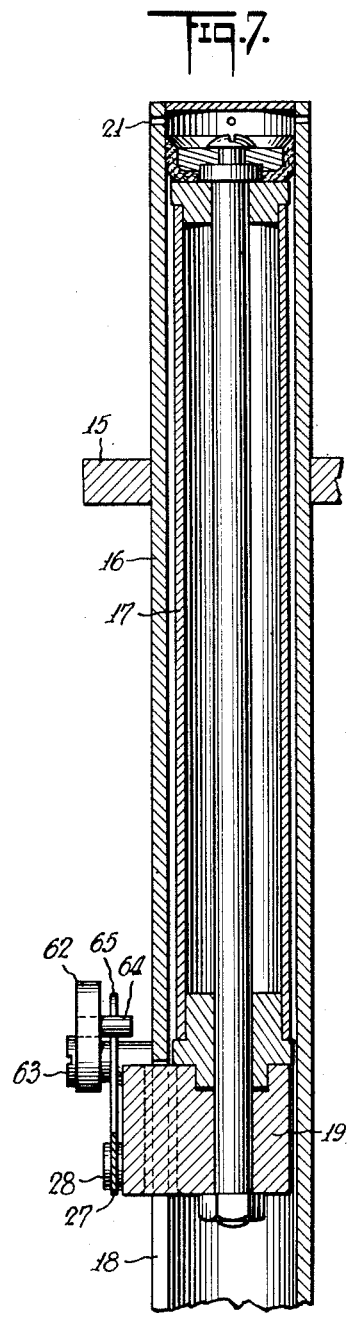
INVENTOR
Ernest B. Miller
BY Herman Sid
ATTORNEY

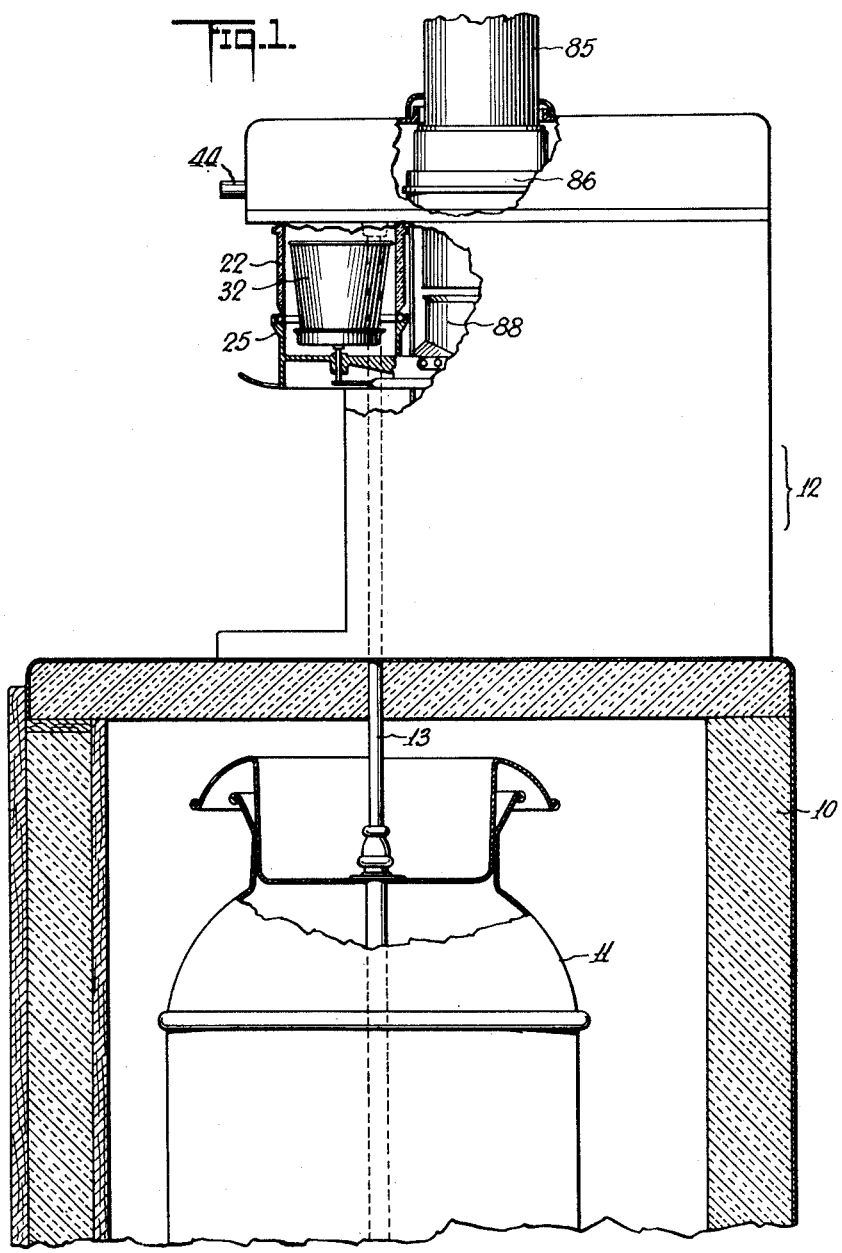

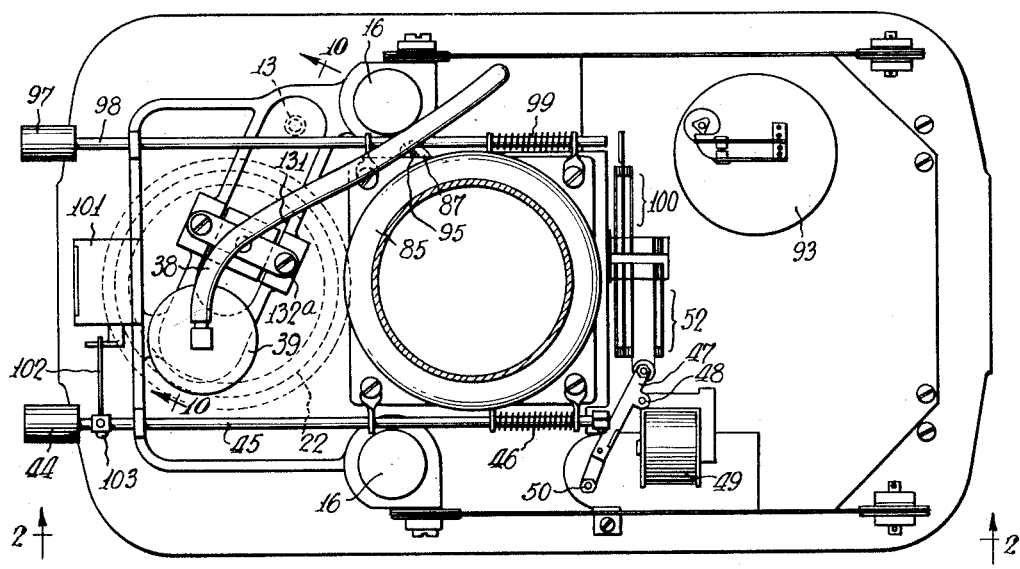
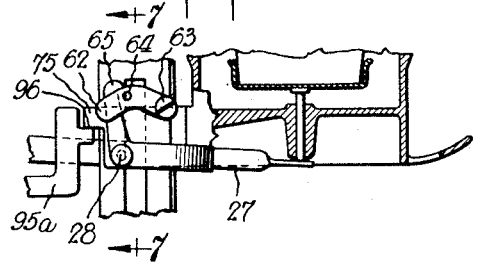
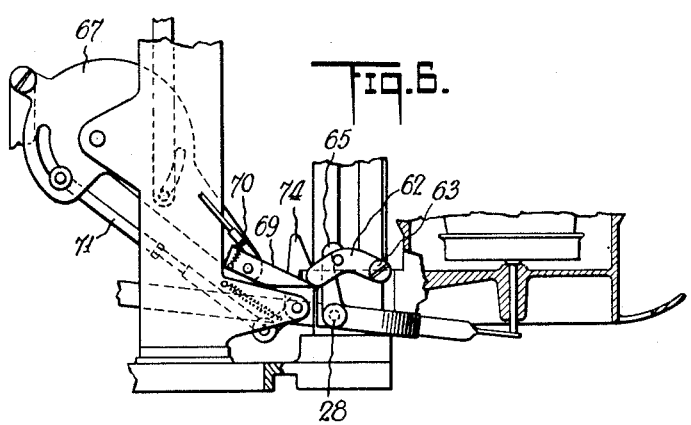

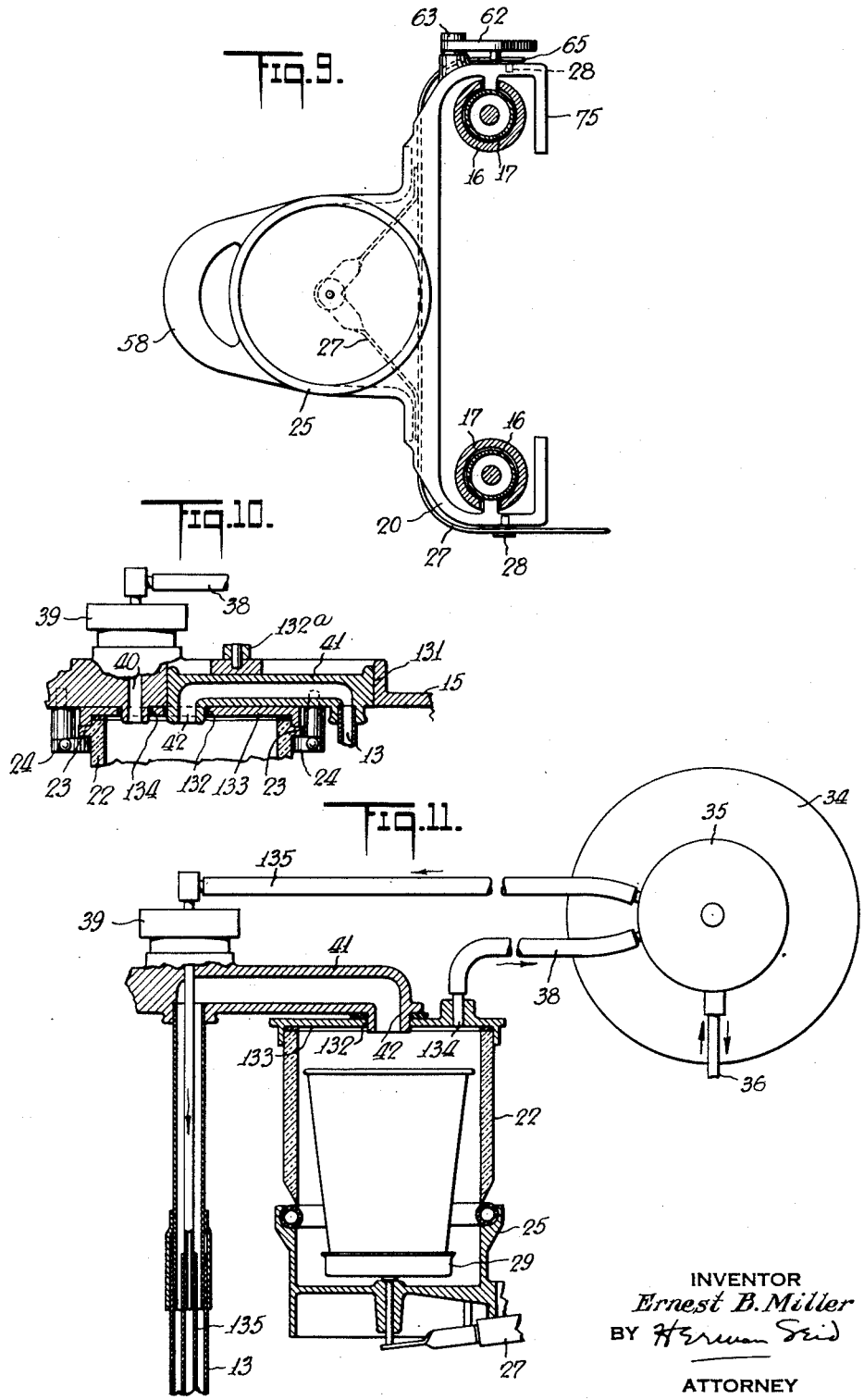

Patented Oct. 31, 1944

2,361,863

UNITED STATES PATENT OFFICE 2,361,863

LIQUID DISPENSING APPARATUS

Ernest B. Miller, Annapolis, Md., assignor of one-half to Wm. Burnet Wright, Baltimore, Md.

Application July 12, 1938, Serial No. 218,729

18 Claims. (Cl. 249—2)

This invention relates to apparatus for dispensing liquids, particularly such liquids as milk or the like.

The general object of the invention is to provide an improved apparatus for dispensing milk and other liquids from a supply container to glasses or cups or the like in a manner which insures against impairment of the sanitary condition of the milk, and which operates in a convenient, efficient and reliable manner.

Another object of the invention is to provide a liquid dispensing apparatus in which liquid is delivered from an original container to cups or the like, through sanitary conduit means initially contained within said original container from which the liquid is dispensed to said cups.

Another object of the invention is to provide an improved liquid dispensing apparatus in which the glass or cup to which liquid is to be supplied is contained within a chamber completely enclosing and surrounding the same during the filling thereof. Thus, the milk or other liquid supplied to the glass or cup is protected against contamination which might result from exposure to the atmosphere surrounding the apparatus.

Another object of the invention is to provide an improved liquid dispensing apparatus in which the discharge end of a liquid supply line leading from a supply container is sealed against and protected from the ambient atmosphere at all times except when a glass or cup which has been filled by the apparatus is being removed therefrom.

Another object of the invention is to provide an improved apparatus for dispensing liquids such as milk, in which the supply of fluid to a cup or glass or the like, is interrupted automatically after a predetermined amount of liquid has been supplied thereto, in such manner as to insure against overflowing thereof.

Another object of the invention is to provide an improved apparatus for dispensing liquids such as milk, in which liquid is supplied to a container positioned in a suction chamber, by means of a conduit leading to said chamber from a source of liquid supply and by means of a suction line connected to a pressure-reducing means, the end of said suction line being spaced from the top of said container to obviate any possibility of drawing into said pressure-reducing means liquid from said container.

Another object of the invention is to provide an improved apparatus for dispensing liquids such as milk, from a main supply container or the like in which provision is made for suitably agitating the liquid in the supply container to insure against settling thereof and to provide for uniformity of the liquid delivered from said container regardless of the intervals at which liquid is drawn therefrom.

Another object of the invention is to provide an improved liquid dispenser in which paper cups or the like may be used advantageously.

Another object of the invention is to provide a liquid dispensing apparatus which is particularly well adapted to dispense milk and the like, which is relatively simple and inexpensive to construct, which is simple to use, and which complies with the most rigid sanitary requirements in protecting the dispensed liquid against contamination.

A feature of the invention resides in the provision of a liquid dispensing apparatus in which the glass or cup to which liquid is to be supplied is contained within a vacuum chamber sealed from the ambient atmosphere, the top of said glass or cup being spaced from the top of said chamber, liquid being supplied to said glass or cup through an opening formed at the roof of said chamber, the flow of liquid through said opening being effected by reducing the pressure within said chamber whenever it is desired to supply liquid to said glass or cup. The reduction in pressure in said chamber is accomplished by means of a pump connecting with said chamber through a tube or the like, which tube terminates preferably proximate the top of said chamber. Since the cup or glass is spaced from the end of such tube there is no possibility of drawing liquid from said glass or cup into said tube, as in dispensing machines of various types heretofore employed.

Another feature of the invention resides in the provision of a liquid dispensing apparatus having a vacuum chamber within which the container to be filled is disposed in spaced relation with the walls and top of said chamber, said container being removable by lowering the lower wall or the like of said chamber.

Another feature of the invention resides in the provision of a liquid dispensing apparatus in which the removable lower portion of a vacuum chamber adapted to contain a receptacle to be filled, serves to maintain said vacuum chamber in sealed condition, to protect the interior thereof against contamination by the ambient atmosphere, at all times except when said lower portion is depressed for the purpose of removing from said chamber a container which has been filled with liquid.

Another feature of the invention resides in providing a liquid dispensing apparatus having a vacuum chamber adapted to contain a receptacle to be supplied with liquid by the apparatus, said receptacle being mounted within said chamber upon a movable platform which is arranged to interrupt the supply of liquid to said receptacle whenever the receptacle within the chamber has been supplied with a predetermined quantity of liquid.

Another feature of the invention resides in the provision of a liquid dispensing apparatus in which a container which has been suitably supplied with liquid is removable by lowering a carriage supporting said receptacle, the movement of said carriage serving automatically to effect the delivery of an empty receptacle thereto for filling after a full receptacle has been removed therefrom.

Another feature of the invention resides in the provision of a liquid dispensing apparatus embodying a movable carriage adapted to support a receptacle receiving liquid, said carriage being adapted to be depressed after the receptacle supported thereby has been supplied with a desired amount of liquid, the carriage remaining automatically locked in depressed position until the filled receptacle has been removed, the carriage thereupon automatically returning to a predetermined normal position in which it serves to seal against the ambient atmosphere a vacuum chamber receiving the discharge end of a tube or the like serving to deliver liquid from a suitable source thereof.

Another feature of the invention resides in utilizing an air pump for creating a relatively low pressure in a chamber containing a receptacle to be filled whenever it is desired to supply liquid from a suitable source at a higher pressure to a container in said chamber, and utilizing said pump at other times for agitating the liquid at said source by forcibly delivering air therethrough, whereby a homogeneous constituency of the supplied liquid is assured.

Another feature of the invention resides in controlling the operation of the pump referred to in the preceding paragraph by interrupting the suction action thereof on the vacuum chamber of the apparatus whenever a predetermined weight of liquid has been supplied to a container positioned within said vacuum chamber, such container being mounted upon a movable platform associated with a scale beam or the like, the movement of which beam serves to interrupt the operation of an electric motor driving said pump.

Another feature of the invention resides in the provision of means automatically rendering operative said above-mentioned pump at predetermined intervals, for agitating liquid contained within a supply container serving the apparatus.

Other objects and features of the invention will be more apparent from the following description, to be read in connection with the accompanying drawings, in which:

Fig. 1 is a side elevational view, partly broken away, of an apparatus embodying a preferred form of the invention;

Fig. 2 is a side elevational view, partly in section, of a portion of the apparatus of Fig. 1, the side casing being removed to show the working mechanism;

Fig. 3 is a rear elevational view, taken on the line 3—3 of Fig. 2;

Fig. 4 is a plan view, taken on the line 4—4 of Fig. 2;

Fig. 5 is a detail of a latch mechanism employed in conjunction with the movable carriage of the apparatus;

Fig. 6 is a detailed view illustrating the latch mechanism of the apparatus when the carriage is in depressed position;

Fig. 7 is a sectional view through one of the pillars supporting the movable carriage;

Fig. 8 is a schematic wiring diagram of the apparatus;

Fig. 9 is a plan view, partly in section, of the adjustable carriage;

Fig. 10 is a view taken on the line 10—10 of Fig. 4, and

Fig. 11 diagrammatically illustrates an alternative form of the invention.

Referring now to the drawings, the numeral 10 designates generally a casing adapted to receive a container 11 of any desired type containing a liquid which is to be dispensed. As illustrated, the container constitutes a milk can or the like, since the invention may be particularly advantageously utilized in the dispensing of milk, but it is to be understood that the invention is not limited thereto, and that fluids of any desired type may be dispensed, by means of the invention, from any suitable source or sources thereof. Preferably, the casing 10 is insulated and the liquid within the container disposed therein is desirably cooled by any suitable means. Positioned preferably over the casing 10 is a dispensing apparatus generally designated 12, to which liquid from the container 11 is adapted to be supplied through liquid supply line 13 extending upwardly from within container 11.

The apparatus 12 comprises a base portion generally designated 14 above which there is positioned, in spaced relation therewith, a top plate 15 suitably mounted in any desired manner. Extending upwardly from the base portion 14 and through the top plate 15 are a plurality of guide pillars 16, one of these pillars being positioned at each side of the apparatus, as best seen in Fig. 4. Each guide pillar 16 is adapted to receive an elongated piston 17 of any desired construction. The lower portions of the pillars 16 are provided with vertically extending slots 18 which preferably face the outside of the apparatus, as best seen in Fig. 9. The lower portions of pistons 17 carry extensions 19 of a movable carriage structure generally designated 20, the extensions 19 being received within the pillars 16 through slots 18. Movement of the pistons 17 up and down within the guide pillars 16 guides the carriage structure in its up and down movement, the length of the pistons serving to insure the stability of the carriage structure and to maintain it in desired level position at all times. The guide pillars are preferably provided with suitable leak ports or the like, as indicated at 21. As best seen in Fig. 9, the carriage structure 20 is generally U-shaped, as viewed in plan, the center portion of the U-formation extending across the front of the apparatus.

A casing 22, the sides of which are preferably of transparent material such as glass, is provided with a flange 23 proximate its upper end. A pair of cams or the like 24, one on each side of the casing 22, and preferably rotatably mounted on the top plate 15, are adapted to engage the flange 23 of the casing 22 and thus to support the casing in desired fixed position abutting the top plate 15. The carriage 20 is provided with a portion designated 25 which is adapted to abut the lower edge of casing 22 when the carriage 20 is in raised position and to seal the interior of the casing 22 against the ambient atmosphere. The portion 25 of the adjustable carriage constitutes, in effect, a removable portion or continuation of the casing 22. Preferably, the portion 25 is provided at its upper extremity with a resilient sealing edging 26 of any desired construction which is adapted to abut the lower extremity of the casing 22, thus to insure an air-tight joint between the casing section 22 and the portion 25.

The carriage structure 20 also comprises a scale beam 27 which is preferably U-shaped, as best seen in Fig. 9, and which is pivotally connected to the carriage structure at the sides thereof, as indicated at 28. The front portion of the scale beam 27 extends outwardly to a point beneath the casing portion 25. Within the casing portion 25 there is provided a cup holder or the like 29, which is supported upon a pin 30 which extends through the bottom of casing portion 25 and is adapted to abut the outwardly extending portion of the scale beam 27. Suitable packing may be provided, if desired, to prevent air leakage around the pin 30. The rear portion of the scale beam 27, that is, the portion lying beyond the pivot points 28 toward the rear of the apparatus, is provided with a weight 31 of any desired type which preferably is adjustable along the length of the rearward portion of the scale beam. Thus, it will be seen that by suitable adjustment of the weight 31, the scale beam will cause the pin 30 and the cup holder 29 to be in raised position except when a predetermined weight of liquid is received within cup 32, at which time the weight of such liquid will overcome the balancing force of weight 31 and cause counterclockwise rotation of the scale beam 27, as viewed in Fig. 2.

Suitably mounted within the apparatus preferably upon top plate 15, is an electric motor 33 actuating a fluid pump 34 which is preferably of the gear type and which is provided with a rotary valve 35. The valve 35 is of that type, (well-known in the art and requiring no detailed description here) in which the direction of fluid flow through fluid lines connected to the pump, for example, may be reversed by actuation of the valve, without affecting the direction of rotation of the pump. The pump 34 communicates with the ambient atmosphere through a tube 36 which is preferably provided with a filter 37, so that when air is supplied to the pump through line 36, this air will be relieved of dust and other particles of foreign matter. The pump 34 is also provided with another tube 38 which is adapted to communicate with the interior of casing 22 through a filter 39 and an extension tube 40, extending through the top plate 15 and an opening in the top of casing 22. Thus, when the rotary valve 35 is so adjusted that the tube 38 constitutes a suction line, air is withdrawn from the casing section 22 and is exhausted to the ambient atmosphere through tube 36, whereby the pressure in casing 22 is appreciably lowered. Since the liquid in container 11 is substantially at the pressure of the ambient atmosphere, the reduction of pressure within casing 22 induces liquid flow to the casing 22 upwardly from the container 11 through liquid supply line 13 and channel piece 41, which is adapted to discharge such liquid within the cup 32 positioned below the discharge channel 42 of the channel piece 41.

It is to be noted that the cup 32 is positioned within the casing 22 so that at all times it is spaced from the walls and top thereof, so that there is no contamination of the cup by contact with the inner surfaces of the casing 22. Further, it is to be noted that the discharge channel 42 and the extension tube 40 of the suction line 38 both terminate above the top of the cup 32. The fact that the extension tube 40 of the suction line is thus arranged is of particular importance since the spacing of the end of the tube at an appreciable distance above the top of the cup 32 prevents the withdrawal into the suction line 38 of any fluid or froth from the top of fluid supplied to the cup 32.

Ordinarily, the rotary valve 35 is maintained by spring 43 in such position that operation of the pump 34 causes delivery of air to the casing 22 through line 38 rather than the withdrawal of air from the casing through said line. However, when it is desired to supply liquid to a cup 32 or the like positioned within casing section 22, this may be accomplished by pressing the extension end 44 of valve control rod 45, which is preferably suitably guided and mounted above the top plate 15, the pressing of the rod 45 being against the pressure of spring 46 which ordinarily maintains the rod 45 in outward position. Pressing the rod 45 inwardly causes the end of this rod to abut an armature 47 pivotally mounted at 48, and to press the armature 47 against a holding coil 49. The end of armature 47 is connected at 50 to a rod 51 controlling the position of the rotary valve 35. When the rotary valve 35 is rotated clockwise, as viewed in Fig. 2, by movement of the armature 47, the operation of the pump 34 constitutes the line 38 a suction line and thus is effective to establish flow of liquid from the container 11 to the cup 32. The holding coil 49 holds the armature 47, so that after an initial pressing of the rod 45, the pressure thereupon may be released and the rod permitted to return to its initial position, with the assurance that the adjustment of the rotary valve 35 will not be disturbed until the filling of the cup is completed. The actuation of armature 47 by the rod 45 is effective to operate the control switch 52 which energizes the holding coil 49 and which renders the motor 33 operative. When a predetermined weight of liquid has been supplied to the cup 32, the forward end of the scale beam 27 is depressed and the rearward portion thereof is raised. The rearward portion thereupon engages a lever 53, pivoted as at 54, and bearing a wedge or the like 55 preferably formed of insulating material. Actuation of the lever 53 by the rear portion of the scale beam 27, through a laterally extending pin 56 mounted on the scale beam, causes the contacts of switch 57 to be separated by wedge 55, thus interrupting the electrical circuit energizing the motor 33 and the holding coil 49. Accordingly, after a cup has been filled with a desired weight of liquid, the operation of the pump is automatically stopped, so that the supply of liquid to the cup is interrupted, and the rod 51 is permitted to return to its initial position under the influence of spring 43. Thus, the valve 35 is changed from what may be termed "suction position" to what may be termed "agitation position."

The cup having been filled, the next step in normal operation of the apparatus is to effect the removal thereof. This is accomplished by grasping the handle 58 comprising an extension of the casing portion 26 and part of the carriage structure 20, and bearing downwardly on the handle to lower the carriage structure, which is counterweighted by weights 59 connected to the carriage structure by cables 60 carried upon suitable pulleys or the like 61.

Referring more particularly to Figs. 5 and 6, the movable carriage structure carries, preferably at one side thereof, a dog 62 which is pivotally mounted at 63 and which carries a laterally extending pin or the like 64. A hook 65 is mounted upon and formed integrally with the scale beam 27, and is so arranged that when the front portion of the scale beam 27 is depressed, due to the supply to the cup 32 of a sufficient amount of liquid to overcome the weight 31 carried upon the rear portion of the scale beam, the end portion of hook 65 will overlie and engage the pin 64 of the dog 62. Since the carriage structure 20 is lowered when the cup in casing 22 is full, it is obvious that when the carriage structure is lowered to permit removal of the cup, the dog 62 will be engaged by the hook 65 and thus prevented from rotating clockwise about the pivot point 63, as viewed in Fig. 5.

Carried on side supporting arm 66 is a rotatable cam 67 having pivotally attached to the arm portion 68 thereof a finger 69 which is adapted to be engaged by dog 62 upon downward movement of the carriage structure 20. The arm portion 68 is provided with a stop pin 70 to prevent clockwise rotation of the finger 69, as viewed in Fig. 6. Accordingly, the downward movement of the carriage structure serves to rotate the cam 67 in clockwise direction, as viewed in Fig. 6, and in counter-clockwise direction as viewed in Fig. 2. Associated with the cam 67 is a rod 71, the end of which is engaged within a slot 72 formed in cam 67. The slot 72 is so arranged that as the cam 67 is rotated in response to downward movement of the carriage structure 20, the rod 71 is not actuated until the end of the rod has travelled to the end of the slot 72. Accordingly, the rod 71 is not rendered operative until the carriage structure 20 has almost completed its downward travel. At this time the rod 71 is actuated and through arm 73 actuates a retaining hook 74 to engage an extension piece 75 of the carriage structure. The retaining hook 74 thus prevents upward motion of the carriage structure 20 so long as it engages the extension piece 75, and the hook 74 continues to engage extension piece 75 until a filled cup is removed from holder 29. Thus a filled receptacle may be removed from the cup holder 29 as rapidly or as leisurely as desired, without fear that the carriage structure will suddenly rise and interfere with the removal of the cup.

Upon the removal of the filled cup from the cup holder, the weight 31 of the scale beam is effective to cause counter-clockwise rotation of the scale beam as viewed in Figs. 5 and 6. Such rotation of the scale beam serves to rotate the hook 65 and thereby releases the dog 62, which thereafter is free to rotate about the pivot point 63. Accordingly, the dog 62 is no longer operative to restrain and bear against the finger 69 extending from cam 67, and the cam is rotated, in counter-clockwise direction as viewed in Fig. 6, under the influence of spring 76, to which the cam is connected through cable 77 suitably carried upon a pulley or the like 78. Rotation of the cam 67 under the influence of spring 76 is controlled by dashpot 79 to which the cam is suitably connected in any desired manner, as by rod 80. After the cam 67 has rotated under the influence of spring 76 sufficiently to take up the lost motion due to slot 72, the rod 71 is caused to overcome the influence of spring 81 and to release retaining hook 74 from extension piece 75. The carriage structure, thus released, then automatically rises under the influence of weight 59. Due to the friction within the guide pillars 16 and the dashpot action thereof, the return of the carriage structure 20 is gradual rather than precipitate. The upward movement of the carriage structure 20 is limited by the provision of a stop piece 82 which is adapted to abut a stop rod 83 depending from the top plate 15 after the carriage structure has risen to a predetermined height. To cushion the downward movement of the carriage structure, there is preferably provided a resilient bumper or the like 84, carried upon the scale beam 27 or any other desired portion of the carriage structure. Spring 81 serves to keep the hook 74 in engagement with extension piece 75 during the clockwise rotation of cam 67, as viewed in Fig. 2, and until rod 71 is actuated by cam 67.

The apparatus is preferably provided with a container 85 for paper cups or the like, which is provided with a dispensing mechanism 86, preferably of the conventional type actuated by the forward and backward movement of a lever 87. Cups released by the mechanism 86 are conveyed through a chute 88 to an opening 89 formed in the front wall 90 of the apparatus. The cup-dispensing mechanism is adapted to be actuated by cam 67 which is, to this end, provided with a rod 91, an end of which is received within lost motion slot 92 formed in the cam. The rod 91 is pivotally connected at 93 to a bell crank 94, the upper end of which, designated 95, is adapted to be received within the bifurcated end portion of lever 87. Thus, upon downward movement of the carriage structure 20 and rotation of the cam 67 in a first direction, the lever 87 of the dispensing mechanism is moved in a first direction, and subsequently, upon upward movement of the carriage after a filled receptacle has been removed therefrom, and upon rotation of the cam 67 back toward its original position, the lever 87 is moved in a reverse direction, thus releasing from the container 85 a fresh cup which is delivered through the chute 88 and is received automatically within the cup container 29 of the carriage structure. Slot 72 in cam 67 provides sufficient lost motion for the fresh cup to be delivered into the cup holder 29 before the hook 74 releases the carriage for its upward movement. The slot 92 in cam 67 provides lost motion which allows time for the operator to remove a filled cup from the apparatus, after raising it upwardly from container 29, before the fresh cup is discharged from the cup dispenser. As the carriage structure moves upwardly, the freshly supplied cup is received within the casing 22 which is sealed by the lower casing portion 25, and the apparatus is ready for a repetition of the operating cycle as above described, upon a pressing of the extension end 44 of the control rod 45.

To prevent settling of the liquid in container 11, and to insure uniform constituency of liquid delivered therefrom, provision is made for agitating the milk or other contents of the container. As above explained, the rotary valve 35 is maintained by spring 43, in agitating position at all times except when rod 45 is maintained in pushed-in position. Thus, except during those periods when liquid is being drawn from container 11, operation of pump 34 serves to draw air inwardly through tube 36 and to deliver this air under pressure to the interior of casing 22 through tube 38. The air delivered to casing 22 in this manner is forced through the tube 13 into the liquid in container 11, and, bubbling up through such liquid, serves effectively to provide the desired agitation thereof. Preferably this agitation occurs at predetermined intervals. Accordingly, there is provided an electrical timing switch 93, of any desired construction, which is adapted to energize motor 33 at predetermined intervals for short periods. In practice, it has been found expedient to adjust the timing switch 93 in such manner that the motor 33 is operated for approximately twenty seconds every three minutes. The frequency and duration of agitating periods may be varied as required.

Since, during agitation periods, a positive air pressure is developed within the chamber formed by casing 22 and lower casing section 25, there is a tendency for the carriage structure to be depressed. Since this would result in equalization of the pressure at both ends of line 13 and would thereby prevent the desired agitation, means are provided for preventing the displacement of the lower casing portion 25 during agitating periods. As illustrated, solenoid locking device 94 is mounted on supporting arm 66, and controls the movement of a locking member 95a (best seen in Fig. 5) which is forced forward when the device 94 is energized. In forward position, the member 95a engages shoulder 96 of extension piece 75 of the carriage structure and prevents downward movement thereof. When the device 94 is not energized, the locking member 95a is retracted so as not to interfere with the upward and downward travel of the carriage. The device 94 is arranged so that it is energized only when the motor 33 is operative for agitation, and is not energized when the motor is operative during liquid supply periods. As noted above, the filter 37 provides for the removal of dust and other foreign matter from the air supplied to the apparatus during periods of agitation.

During ordinary operation of the apparatus, the supply of liquid to a cup or glass being filled will continue until the weight thereof is sufficient to cause the scale beam 27 to open the switch 57. However, it may be desired, at times, to interrupt the supply of liquid before the complete delivery of the normal quantity for which the apparatus has been adjusted. This may be accomplished by pressing inwardly on the extension end 97 of control rod 98, against the pressure of spring 99 which normally holds the control rod 98 in outward position. Movement of the end of rod 98 in this manner opens a circuit through switch 100 and thus interrupts the energization of motor 33.

If it is desired to agitate the liquid in container 11 at periods other than and in addition to those provided for by electric timing switch 93, this may be done manually by pressing in rod 98 somewhat further than as described above in connection with the interruption of liquid supply. Thus pushing the rod 98 further in completes an electrical circuit which energizes the motor 33, the operation of which results in agitation since the rotary valve 35 is necessarily in agitating position whenever the control rod 98 is pushed in. Since no holding coil is provided in connection with the rod 98, the agitation provided thereby is terminated whenever the pressure on the rod 98 is relieved.

In order to determine the number of times which the apparatus is actuated by pressing the rod 45, there is preferably provided a counting device 101 of any desired type, preferably mounted upon the top of the plate 15 and actuated by an arm 102 suitably secured to the rod 45, as by means of set screw or the like 103, and movable therewith.

As above described, the weight 31 mounted upon the scale beam 27 is effective to determine the amount of liquid supplied to the cup within casing 22, and shut off the supply of liquid after a predetermined amount thereof has been delivered. In order to prevent the necessity for moving the entire liquid balancing weight completely through the arc described by rotation of scale beam 27, and to provide for quickly effective shut off action, the weight 31 is preferably arranged so that its moment about the pivot 28 is less than the moment of the filled container about the pivot 28. Accordingly, as the cup is filled with liquid the scale beam 27 is permitted to rotate relatively rapidly. However, the rotation of the scale beam is sharply checked as it approaches the end of the arc of its rotation by causing the scale beam to pick up an additional weight. To this end there is provided an adjustable stirrup 104, extending downwardly from the plate 15, and which preferably comprises two portions adjustable with respect to each other by means of screws 105 threaded to one of the parts and extending through a slot 106 formed in the other of the parts of said stirrup. While this is a preferred arrangement, it is to be understood that any suitable means may be provided for adjustably positioning the lower extremity of the stirrup 104. The stirrup is adapted to support a cross rod 107 carrying an adjustable weight 108, the opposite end of rod 107 being pivotally mounted on side supporting arm 66 as indicated at 109. Thus during the initial part of its upward travel the rear portion of the scale beam is impeded only by the weight 31, but as the rear portion of the scale beam rises further, it engages the rod 107 which serves as an additional weight upon the scale beam 27. Thus, while the actual shutting off of the liquid flow to the cup is determined by the combined weights of weight 31 and 108, or more properly the moments of these forces, the rotation of the scale beam is relieved of the sluggish action which would occur if all of the rotation of the scale beam occurred while under the restraining influence of the total weight used to counterbalance and limit the liquid supply. It will be apparent that by sliding the weight 31 along the scale beam 27 and by sliding the weight 108 along rod 107, the weight of the liquid supplied to containers in the casing 22 may be suitably regulated. Further, while the stirrup arrangement described is preferred for the purpose of imposing an additional or pick-up weight on the scale beam 27, it will be apparent to those skilled in the art that this result may be accomplished in various ways within the scope of the invention.

Referring now to the wiring diagram of Fig. 8, it will be observed that the switch 52 comprises a contact 110, a double contact 111, a contact 112, a contact 113 and a contact 114. The contacts 110, 111 and 112 are normally out of contact with each other, while the contacts 113 and 114 are normally in contact with each other. Further, switch 100 comprises a contact 115, a double contact 116 and a contact 117. The contacts 115 and 116 are normally in engagement with each other, but the contacts 116 and 117 are normally out of engagement with each other. When the rod 45 is pressed inwardly to effect supply of liquid to a cup or other receptacle, that portion of the armature 47 which is positioned between the various contacts of switch 52, is moved to the left as viewed in Fig. 8 and in Fig. 4. Thus, the contacts 110 and 111 are brought into engagement, the contacts 111 and 112 are brought into engagement and the contacts 113 and 114 are separated from each other. The contacts of switch 57 are normally closed, these contacts being open only when the rear portion of the scale beam rises in response to the supply of a predetermined weight of liquid to a receptacle supported on the scale beam. Accordingly, when the rod 45 is pushed inwardly there is completed an electrical circuit including supply line 118, lead 119, lead 120, holding coil 49, lead 121, contacts 111 and 110, lead 122, switch 57, contacts 115 and 116 and another supply line 123. Thus the holding coil 49 is energized. Similarly, the motor 33 is energized by the circuit including line 118, lead 119, lead 124, the motor 33, lead 125, contacts 112, 111 and 110, lead 122, switch 57, contacts 115 and 116 and line 123. It will be apparent that when the switch 57 is opened by the scale beam, the operation of the motor 33 will be interrupted and the holding coil 49 will be energized, whereupon the armature 47 will be returned to the position shown in Fig. 8 by spring 43, in which the contacts 110 and 111 and 112 are open while contacts 113 and 114 are closed. Further, it will be obvious that the supply of liquid may be interrupted, by deenergization of motor 33 and holding coil 49, by pressing upon lever 98 sufficiently to separate the contacts 115 and 116.

Whenever the electrical timing device 93 calls for agitation, the contacts 126 and 127 of the device are closed, thus completing an electrical circuit including line 123, lead 128, contacts 127 and 126, solenoid locking device 94, lead 129, contacts 114 and 113, lead 125, motor 33, lead 124, lead 130 and line 118. After the expiration of the interval during which the timing device is operative, the contacts 126 and 127 are separated and the motor 33 and solenoid locking device 94 are deenergized.

If it is desired to agitate the liquid in container 11 under manual control, this may be accomplished by pressing the lever 98 inwardly a sufficient distance to separate the contacts 115 and 116, and to cause the contact 116 to abut the contact 117. Thus there will be completed an electrical circuit including line 123, contact 116, contact 117, lead 131, solenoid locking device 94, lead 129, contacts 114 and 113, lead 125, motor 33, lead 124, lead 119, lead 130 and line 118, so that the motor 33 is energized. It will be noted that the solenoid locking device 94 is energized only during periods of agitation and that this device is rendered effective regardless of whether the agitation is provided by the electric timing switch 93 or by means of manual control switch 101.

After the liquid supply of a container 11 has been exhausted it becomes necessary to remove the original container 11, tube 13 and channel piece 41. This is accomplished by manually depressing the carriage structure to a slight degree, rotating the cams 24 so that they no longer engage the flange 23 of the casing structure 22 and removing the casing 22. Removal of the casing 22 with its top wall permits the channel piece 41 to be lowered from and out of the apparatus by telescoping together the different sections of the supply line 13. The emptied container 11 with its tube 13 and channel piece 41 are then removed from the casing 10 and are replaced. The newly supplied container is installed by manually raising the channel piece 41 provided therewith by extension of the telescopically arranged supply line 13 and raising the channel piece 41 thereof into the opening 131 formed in the top plate 15. A strap 132a mounted across the opening 131 limits the height to which the channel member is raised. While the inserted channel piece is held within the opening 131 by the supply line 13, the casing 22 is replaced in such manner that the discharge channel 42 of channel piece 41 extends within the opening 132 provided in the top 133 of casing 22, and so that the extension tube 40 extends within the opening 134 formed in the top 133 of casing 22. Thereupon, the cams 24 are rotated to lock the casing 22 in position and the apparatus is again ready for operation. Since the telescopic sections of the supply line 13 and the channel piece 41 are sterilized, as contemplated, and then maintained in protected condition within the container 11 until they are ready for use, and since the milk or other liquid which is delivered to the cup comes in contact only with the tube 13 and the channel piece 41, the sanitary condition of the delivered liquid is assured. Freedom from contamination is further assured by the fact that the casing 22 is sealed against the ambient atmosphere at all times except when the lower casing section 25 is being depressed or raised or is in lowered position so that a filled receptacle may be removed therefrom; and by the fact that the top of the cup or other container is not contacted with the inner surfaces of the casing 22.

Fig. 11 diagrammatically illustrates a modified form of the invention. As above described, agitation of the liquid in container 11 is dependent upon the supply of air from pump 34 through line 38 to casing 22 and from the casing 22 to the container 11 through tube 13. In the arrangement illustrated in Fig. 11 there is provided an additional tube 135 for delivering air from pump 34 to container 11. Preferably, tube 135 extends within supply line 13. Thus when it is desired to agitate the liquid in container 11 the air supplied for agitation is delivered through line 135 directly to the container 11 in a course which bypasses and is independent of the interior of casing 22. It will be observed that in this modification of the invention the valve 35 is provided with three outlets rather than two outlets as discussed in connection with the preceding figures. Thus there is provided an outlet for tube 36 which communicates with the ambient atmosphere, an outlet for suction line 38, and an outlet for agitation air line 135. The adjustment of the rotary valve 35 to effect either agitation of the liquid in container 11 or the withdrawal of liquid therefrom may be accomplished in any desired manner, preferably as above described. Thus when the rod 45 is pressed inwardly, the valve is adjusted to effect withdrawal of air through suction line 38 so as to induce liquid flow from the container 11, and at all other times the valve 35 is maintained by spring 43 in position so that operation of the pump serves to deliver air from the pump to the container 11 for agitating the contents thereof.

While the invention has been described with particular reference to paper cups or the like and preferably embodies a mechanism for automatically feeding such cups to the vacuum chamber within casing 22 one at a time, it is to be understood that the invention is not limited to such an arrangement. If desired, the automatic cup-dispensing mechanism may be eliminated, and a fresh cup or glass or the like, may be supplied to the holder 29 at will. Thus, a fresh container may be supplied to the holder 29 immediately after a filled cup or the like has been removed therefrom, or the carriage structure may be allowed to rise after removal of a filled receptacle, in which case the carriage would again be lowered manually when it is desired to supply an empty container to the holder 29 for filling. It will be appreciated, however, that in installations and applications requiring frequent operation of the apparatus, the automatic dispensing of suitable paper cups or the like is highly desirable.

Since many changes may be made in the invention without departing from its scope, it is intended that all matter contained in the above description or shown in the accompanying drawings shall be interpreted as illustrative only and not in a limiting sense, applicant limiting himself only as indicated in the appended claims.

I claim:

1. In an apparatus of the character described, means forming a substantially sealed chamber adapted to contain an open-mouthed receptacle to be supplied with liquid, the interior of said receptacle being in unrestricted communication with the remainder of the interior of said chamber a source of liquid, means providing communication between said source of liquid and the upper portion of said chamber, said last-mentioned means terminating over the open mouth of said receptacle and being spaced therefrom and being adapted to discharge liquid downwardly into the mouth thereof, and means for reducing the pressure in said chamber below the pressure of said source of liquid whenever it is desired to supply liquid from said source within said chamber and to said receptacle, the pressure reducing means terminating within said chamber at a point outside of the interior of said receptacle and out of contact therewith.

2. In an apparatus of the character described, means forming a substantially sealed chamber, means for supporting within said chamber a receptacle to be supplied with liquid in such manner that the top of said receptacle is spaced from the top of said chamber, a source of liquid, conduit means connected between said source of liquid and the upper portion of said chamber, said conduit means being adapted to discharge liquid from said source into said receptacle and terminating over and at a point spaced from the upper extremity of said receptacle, and means for reducing the pressure in said chamber below the pressure prevailing at said source of liquid, whereby to provide for flow of liquid from said source through said conduit means to said receptacle within said chamber, the pressure reducing means terminating within said chamber at a point outside of the interior of said receptacle and out of contact therewith.

3. In an apparatus of the character described, means forming a closed chamber adapted to contain an open-mouthed receptacle, the interior of which is in unrestricted communication with the remainder of the interior of said chamber, said means including a removable casing portion adapted when in raised position to seal said chamber and to open said chamber when in lowered position, means for adjustably mounting said lower casing portion, a source of liquid, conduit means connecting said source of liquid with the upper portion of said chamber and terminating over the mouth of said container in spaced relation therewith, and means for reducing the pressure in said chamber, when said lower casing portion is in raised position, below the pressure of said source of liquid, whereby liquid will be delivered through said conduit means within said chamber to said receptacle positioned therewithin, and whereby said receptacle may be removed by lowering said lower casing portion, the pressure reducing means terminating within said chamber at a point outside of the interior of said receptacle and out of contact therewith.

4. In an apparatus of the character described, means forming a closed chamber, means for supporting within said chamber a receptacle to be supplied with liquid, a source of liquid, conduit means connecting with said source and arranged to discharge liquid into said receptacle, the discharge end of said conduit means terminating at a point above any horizontal plane to which said receptacle extends and being spaced from the top of said receptacle, means for reducing the pressure in said chamber below the pressure of said source to induce liquid flow through said conduit means to said receptacle, and weight-responsive means associated with said receptacle supporting means for interrupting the operation of said pressure-reducing means and said flow of liquid whenever a predetermined weight of liquid has been supplied to said receptacle.

5. In an apparatus of the character described, a casing, closure means for said casing, means for movably mounting said closure means, means for supporting within said casing a receptacle adapted to be supplied with liquid, a source of liquid, conduit means connecting said source of liquid with the upper portion of said casing and adapted to discharge into said receptacle, means for reducing the pressure in said casing below the pressure of said source when said closure means is in raised position and closes said casing, whereby liquid flows through said conduit means from said source to said receptacle, said closure means being adapted to then be depressed to permit removal of said filled receptacle, and means responsive to the removal of said filled receptacle for effecting a return of said closure means to said casing, whereby said closure means is effective to seal said casing at all times except when said closure means is being lowered or raised, or, in lowered position, supports a filled receptacle.

6. In an apparatus of the character described, a casing, an adjustably mounted carriage structure including closure means for said casing, said carriage structure being adapted to support a receptacle to be supplied with liquid in such manner that when said carriage structure is in position to cause a closing of said casing by said closure means said receptacle will be contained within said closed casing, a source of liquid, conduit means connecting said source of liquid with the upper portion of said casing and adapted to discharge into said receptacle when said casing is closed by said closure means, means for reducing the pressure in said casing below the pressure of said source when said closure means closes said casing, whereby liquid flows through said conduit means from said source to said receptacle, said carriage structure being adapted to be adjustably positioned to remove said closure means and said receptacle from said casing, and means for locking said carriage structure in spaced relation from said casing, whereby said carriage structure may be adjustably positioned subsequent to the filling of a receptacle supported thereby and retained in fixed position to facilitate removal of said filled receptacle.

7. In an apparatus of the character described, a casing, an adjustably mounted carriage structure including closure means for said casing, said carriage structure being adapted to support a receptacle to be supplied with liquid in such manner that when said carriage structure is in position to cause a closing of said casing by said closure means said receptacle will be contained within said closed casing, a source of liquid, conduit means connecting said source of liquid with the upper portion of said casing and adapted to discharge into said receptacle, means for reducing the pressure in said casing below the pressure of said source when said closure means closes said casing, whereby liquid flows through said conduit means from said source to said receptacle, said carriage structure being adapted to be adjustably positioned to remove said closure means and said receptatcle from said casing, means for locking said carriage structure in spaced relation from said casing, whereby said carriage structure may be adjustably positioned subsequent to the filling of a receptacle supported thereby and retained in fixed position to facilitate removal of said filled receptacle, and means responsive to the removal of said filled receptacle for rendering inoperative said last-mentioned means.

8. In an apparatus of the character described, means forming a casing, adjustably mounted closure means for said casing, receptacle-supporting means adapted to engage the exterior of and to support a receptacle to be filled with liquid within said casing when said closure means is in position to close said casing, said receptacle-supporting means being movably mounted with respect to said closure means, a source of liquid, conduit means connected to said source and adapted to discharge liquid therefrom within said casing and to said receptacle, means for reducing the pressure of said casing below that of said source to induce liquid flow through said conduit means and into said receptacle, said receptacle-supporting means being adjustably positioned with respect to said closure means responsive to filling of said receptacle, and means responsive to the movement of said receptacle-supporting means within said casing and with respect to said closure means for interrupting the flow of liquid through said conduit means.

9. In an apparatus of the character described, means forming a casing, adjustably mounted closure means for said casing, receptacle-supporting means adapted to support a receptacle to be filled with liquid within said casing when said closure means is in position to close said casing, said receptacle-supporting means being movable with said closure means with respect to said casing and also being movably mounted with respect to said closure means, a source of liquid, conduit means connected to said source and adapted to discharge liquid therefrom within said casing and into said receptacle, means for reducing the pressure of said casing below that of said source to induce liquid flow through said conduit means and into said receptacle, said receptacle-supporting means being adjustably positioned with respect to said closure means responsive to filling of said receptacle, weighing means in combination with said receptacle-supporting means, and means responsive to the supply of a predetermined weight of liquid to said receptacle for interrupting the supply of liquid from said source to said receptacle.

10. In an apparatus of the character described, means forming a casing, closure means for said casing comprising a portion of an adjustably mounted carriage structure, receptacle-supporting means adapted to support a receptacle to be filled with liquid within said casing when said closure means is in position to close said casing, said receptacle-supporting means being movably mounted with respect to said closure means and comprising another portion of said carriage structure, weighing means in combination with said receptacle-supporting means, a source of liquid, conduit means connected to said source and adapted to discharge liquid therefrom within said casing and to said receptacle, means for reducing the pressure of said casing below that of said source to induce liquid flow through said conduit means and into said receptacle, said receptacle-supporting means being adjustably positioned with respect to said closure means responsive to filling of said receptacle, means for interrupting the supply of liquid through said conduit means whenever a predetermined weight of liquid has been supplied to said receptacle, said carriage structure being removable from the vicinity of said casing to a position facilitating the removal of a receptacle which has been suitably supplied with liquid, means for locking said carriage structure in said position, and means under the control of said weighing means for rendering inoperative said last-mentioned means upon the removal of a filled receptacle from said receptacle-supporting means.

11. In an apparatus of the character described, means forming a casing, closure means for said casing comprising a portion of an adjustably mounted carriage structure, receptacle-supporting means adapted to support a receptacle to be filled with liquid within said casing when said closure means is in position to close said casing, said receptacle-supporting means being movably mounted with respect to said closure means and comprising another portion of said carriage structure, weighing means in combination with said receptacle-supporting means, a source of liquid, conduit means connected to said source and adapted to discharge liquid therefrom within said casing and to said receptacle, means for reducing the pressure of said casing below that of said source to induce liquid flow through said conduit means and into said receptacle, said receptacle-supporting means being adjustably positioned with respect to said closure means responsive to filling of said receptacle, means for interrupting the supply of liquid through said conduit means whenever a predetermined weight of liquid has been supplied to said receptacle, said carriage structure being removable from the vicinity of said casing to a position facilitating the removal of a receptacle which has been suitably supplied with liquid, means for locking said carriage structure in said position, means under the control of said weighing means for rendering inoperative said last-mentioned means upon the removal of a filled receptacle from said receptacle-supporting means, and means for returning said carriage structure, upon release thereof from the control of said locking means, to a position in which said closure means is effective to close said casing.

12. An apparatus of the character described having a casing, movable closure means for said casing, a source of liquid, conduit means connecting said source of liquid to said casing, fluid displacement means, means for reducing the pressure within said casing below that of the ambient atmosphere and that of said source responsive to operation of said fluid displacement means whenever it is desired to supply liquid from said source to said casing, means for creating within said casing responsive to the operation of said fluid displacement means a pressure exceeding that of the ambient atmosphere and for supplying fluid from said displacement means to said source when it is desired to agitate liquid of said source, a locking mechanism for preventing displacement of said closure means from said casing, and means for rendering operative said last-mentioned means whenever fluid is supplied from said displacement means to said source.

13. In an apparatus of the character described, means forming a chamber adapted to contain a receptacle to be supplied with liquid, a source of liquid, first conduit means connecting said source of liquid with said chamber, fluid displacement means, second conduit means providing communication between said chamber and said fluid displacement means, and third conduit means connecting said fluid displacement means and said source of liquid, and means for selectively operating said displacement means to create a relatively low pressure in said second conduit means, whereby to induce flow of liquid from said source to said chamber through said first conduit means, or to forcibly deliver fluid from said displacement means to said source through said third conduit means, whereby to effect agitation of liquid at said source.

14. In an apparatus of the character described, means forming a chamber adapted to contain a receptable to be supplied with liquid, a source of liquid, first conduit means connecting said source of liquid with said chamber, fluid displacement means, second conduit means providing communication between said chamber and said fluid displacement means, and third conduit means connecting said fluid displacement means and said source of liquid, and valve means associated with said fluid displacement means for selectively creating a relatively low pressure in said second conduit means and in said chamber responsive to operation of said fluid displacement means, whereby to induce flow of liquid from said source to said chamber through said first conduit means, or for forcibly delivering fluid from said displacement means to said source through said third conduit means responsive to operation of said fluid displacement means, whereby to effect agitation of liquid at said source, said first conduit means and said third conduit means being positioned one within the other throughout at least a portion of their length.

15. In an apparatus of the character described, means forming a casing, an adjustably mounted carriage mechanism including adjustable closure means for said casing, a receptacle-supporting platform adapted to support a receptacle to be filled with liquid within said casing when said closure means is in position to close said casing, said platform being movable with said carriage structure with respect to said casing, and also being movably mounted with respect to said closure means, a source of liquid, conduit means connected to said source and adapted to discharge liquid therefrom within said casing and into said receptacle, means for reducing the pressure within said casing below that of said source to cause liquid flow through said conduit means into said receptacle, said platform being adjustably positioned with respect to said closure means responsive to filling of said receptacle, weighing means in combination with said platform and means responsive to the supply of a predetermined weight of liquid for interrupting the supply thereof to said receptacle.

16. In an apparatus of the character described, means forming a casing, closure means for said casing comprising a portion of an adjustably mounted carriage structure, receptacle-supporting means adapted to support a receptacle to be filled with liquid within said casing when said closure means is in position to close said casing, said receptacle-supporting means being movably mounted with respect to said closure means and comprising another portion of said carriage structure, weighing means in combination with said receptacle-supporting means, a source of liquid, conduit means connected to said source and adapted to discharge liquid therefrom within said casing and to said receptacle, means for reducing the pressure of said casing below that of said source to induce liquid flow through said conduit means and into said receptacle, said receptacle-supporting means being adjustably positioned with respect to said closure means responsive to filling of said receptacle, means for interrupting the supply of liquid through said conduit means whenever a predetermined weight of liquid has been supplied to said receptacle, said carriage structure being removable from the vicinity of said casing to a position facilitating the removal of a receptacle which has been suitably supplied with liquid, and means for returning said carriage structure to a position in which said closure means is effective to close said casing.

17. In an apparatus of the character described, means forming a casing, closure means for said casing comprising a portion of an adjustably mounted carriage structure, receptacle-supporting means adapted to support a receptacle to be filled with liquid within said casing when said closure means is in position to close said casing, said receptacle-supporting means being movably mounted with respect to said closure means and comprising another portion of said carriage structure, weighing means in combination with said receptacle-supporting means, a source of liquid, conduit means connected to said source and adapted to discharge liquid therefrom within said casing and to said receptacle, means for reducing the pressure of said casing below that of said source to induce liquid flow through said conduit means and into said receptacle, said receptacle-supporting means being adjustably positioned with respect to said closure means responsive to filling of said receptacle, means for interrupting the supply of liquid through said conduit means whenever a predetermined weight of liquid has been supplied to said receptacle, said carriage structure being removable from the vicinity of said casing to a position facilitating the removal of a receptacle which has been suitably supplied with liquid, means for returning said carriage structure to a position in which said closure means is effective to close said casing, means to retain a plurality of cups for discharge upon said receptacle-supporting means when said carriage structure is in a position remote from the vicinity of said casing, and means to deposit one of said cups on said receptacle-supporting means when in a position remote from the vicinity of said casing.

18. Liquid dispensing apparatus comprising means forming a substantially sealed chamber, means movable within said chamber for supporting a drinking vessel therein, means to conduct liquid upwardly from a container for discharge into a drinking vessel on said supporting means, said chamber being formed with an opening in its upper end, means to tightly but removably secure the discharge end of said conducting means in said opening for discharge of liquid from said conducting means into said drinking vessel, movable means for permitting the introduction of a drinking vessel into said chamber and for the removal thereof from said chamber, an air line extending from said chamber, means for selectively forcing air through said air line to said chamber for agitating liquid in a container to which said conducting means extends or for drawing air thru said air line from said chamber for drawing liquid from a container into which said conducting means extends for discharge into a drinking vessel on said supporting means, and means responsive to the movement of said supporting means due to the weight thereon for preventing said forcing-and-drawing means from operating as a drawing means when a given weight is on said supporting means.

ERNEST B. MILLER.